(12) United States Patent
Yoon et al.

(10) Patent No.: US 9,442,460 B2
(45) Date of Patent: Sep. 13, 2016

(54) DIGITAL HOLOGRAM DISPLAY DEVICE

(71) Applicant: LG DISPLAY CO., LTD., Seoul (KR)

(72) Inventors: Minsung Yoon, Gyeonggi-do (KR); Sunwoo Kim, Gyeonggi-do (KR); Minyoung Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 380 days.

(21) Appl. No.: 13/949,443

(22) Filed: Jul. 24, 2013

(65) Prior Publication Data

US 2014/0118508 A1 May 1, 2014

(30) Foreign Application Priority Data

Oct. 31, 2012 (KR) .................. 10-2012-0122732

(51) Int. Cl.
| | | |
|---|---|---|
| *H04N 13/04* | (2006.01) | |
| *G02F 1/13* | (2006.01) | |
| *G03H 1/08* | (2006.01) | |
| *G03H 1/12* | (2006.01) | |
| *G11B 7/00* | (2006.01) | |
| *G03H 1/02* | (2006.01) | |
| *G03H 1/22* | (2006.01) | |
| *G02F 1/29* | (2006.01) | |
| *G11B 7/08* | (2006.01) | |
| *G11B 7/0065* | (2006.01) | |

(52) U.S. Cl.
CPC ............. *G03H 1/02* (2013.01); *G03H 1/0841* (2013.01); *G03H 1/2294* (2013.01); *G02F 1/292* (2013.01); *G03H 2001/0224* (2013.01); *G03H 2225/22* (2013.01); *G03H 2225/32* (2013.01); *G11B 7/0065* (2013.01); *G11B 7/083* (2013.01); *H04N 13/0409* (2013.01)

(58) Field of Classification Search
CPC .......... H04N 13/04; H04N 7/18; G03H 1/02; G03H 1/0841; G03H 1/2294; G03H 2001/0224; G03H 2225/22; G03H 2225/32; G11B 7/00
USPC ....... 348/51, 148; 345/8, 156, 633; 349/201; 359/9, 11, 290; 362/19, 97.1; 369/103
See application file for complete search history.

(56) References Cited

U.S. PATENT DOCUMENTS

| | | |
|---|---|---|
| 5,416,618 A | 5/1995 | Juday |
| 2008/0002553 A1 * | 1/2008 | Tachibana ............ G11B 7/0065 369/103 |
| 2010/0232000 A1 * | 9/2010 | Futterer et al. .................... 359/9 |
| 2012/0224062 A1 * | 9/2012 | Lacoste et al. ............... 348/148 |
| 2012/0235900 A1 * | 9/2012 | Border et al. ................ 345/156 |
| 2013/0100510 A1 * | 4/2013 | Lee et al. ......................... 359/9 |

* cited by examiner

*Primary Examiner* — Thai Tran
*Assistant Examiner* — Syed Hasan
(74) *Attorney, Agent, or Firm* — Morgan, Lewis & Bockius LLP

(57) ABSTRACT

The present disclosure relates to a digital hologram display device displaying 3D image as a hologram by using a complex modulation. The digital hologram display device comprising a spatial light modulator including a first pixel outputting a first modulation light by modulating a phase of a first plane-polarized light and a second pixel outputting a second modulation light by modulating the phase of the first plane-polarized light, wherein the second pixel is adjacent to the first pixel; and a light combiner changing a path of the first modulation light outputted from the first pixel so that the path of the first modulation light corresponds to a path of the second modulation light outputted from the second pixel for combining the first modulation light with the second modulation light, wherein a phase of the first modulation light is different from a phase of the second modulation light.

15 Claims, 8 Drawing Sheets

DIGITAL HOLOGRAM DISPLAY DEVICE

CROSS-REFERENCE TO RELATED APPLICATION

This application claims priority under 35 U.S.C. §119(a) of Korean Patent Application No. 10-2012-0122732, filed on Oct. 31, 2012, which is incorporated by reference in its entirety.

BACKGROUND

1. Technical Field

The present disclosure relates to a digital hologram display device displaying 3D image by using a spatial light modulator.

2. Discussion of the Prior Art

Nowadays researches for three dimension (3D) image and implementing the 3D image are done actively. A 3D image technique provides 3D image corresponding to a full real appearance of an object for observer while a two dimensional (2D) image technique provides image corresponding to a plane view of an object. Thus, the technology of implementing 3D image is an ultimate technology.

Typically three methods are known for reproducing 3D image; a stereoscopic method, a holographic method, and an integral imaging method. The holographic method uses laser beam so that it is possible to observe the 3D image with naked eyes. The holographic method is the most ideal method because and it has an excellent visual stereoscopic property and observer watches the 3D image without any fatigue.

The holographic method records optical interference obtained from superposition of an object beam and a reference beam on a film. The object beam refers to a beam distracted from an object by illuminating a laser beam which has a high coherency, and the reference beam refers to a beam having a high coherency. More specifically, the optical interference can be a series of interference fringes including intensity information and phase information of a light wave, and the film can be a standard photographic film. Thus, the interference fringes are recorded on the standard photographic film. The interference fringes form a type of diffraction grating on the film, which is called the hologram. Therefore, the holographic method can reproduce the 3D image by illuminating the reference beam to the interference fringes.

There was a new development of the computer generated holography (CGH) that is the method of digitally generating the interference fringes. For example, a holographic interference pattern can be generated by digitally computing the interference fringes and printing it onto a mask or film for subsequent illumination by suitable coherent light source. Recently, the computer generated holography for displaying a dynamic image as well as a static image is developed.

The computer generated holography transmits holographic interference pattern data to a spatial light modulator (in the below, referred to as SLM) such as LCSLM (Liquid Crystal Spatial Light Modulator). Then, the SLM displays the holographic interference pattern and the holographic interference pattern is reproduced to the 3D image by illuminating the reference beam to the SLM.

FIG. 1 is the structural drawing illustrating a digital hologram display device using a computer generated holography according to the prior art. Referring to FIG. 1, a computer 10 generates the holographic interference pattern data to be displayed on the SLM 20 and transmits the holographic interference pattern data to the SLM 20. The SLM 20 can be implemented as the LCSLM. In this case, the SLM 20 can be a transmittive liquid crystal display device. The SLM 20 can represent the holographic interference pattern. At one side of the SLM 20, a laser source 30 for generating the reference beam is located. In order to radiate the reference beam 90 from the laser source 30 onto the whole surface of the SLM 20, an expander 40 and a lens system 50 can be disposed, sequentially. The reference beam 90 out from the laser source 30 is radiated to one side of the SLM 20 passing through the expander 40 and the lens system 50. As the SLM 20 is a transmittive liquid crystal display device, the holographic interference pattern will be reproduced at the other side of the SLM 20.

U.S. Pat. No. 5,416,618 discloses a 3D image display device of the holographic method using two transmittive liquid crystal displays. More specifically, U.S. Pat. No. 5,416,618 uses a first SLM for modulating phase of light and a second SLM for modulating amplitude of light in order to maximize an interference of light. Therefore, U.S. Pat. No. 5,416,618 implements the 3D image as a hologram by the interference of light. However, U.S. Pat. No. 5,416,618 has four disadvantages as following: (1) it is difficult to align the first SLM with the second SLM, (2) cost for fabricating the 3D image display device is increased due to two SLMs, (3) thickness of 3D image display device is thicker, and (4) driving of the 3D image display device is complex.

SUMMARY

Embodiments relate to a digital hologram display device comprising a spatial light modulator including a first pixel outputting a first modulation light by modulating a phase of a first plane-polarized light and a second pixel outputting a second modulation light by modulating the phase of the first plane-polarized light, wherein the second pixel is adjacent to the first pixel; and a light combiner changing a path of the first modulation light outputted from the first pixel so that the path of the first modulation light corresponds to a path of the second modulation light outputted from the second pixel for combining the first modulation light with the second modulation light, wherein a phase of the first modulation light is different from a phase of the second modulation light.

The features and advantages described in this summary and the following detailed description are not intended to be limiting. Many additional features and advantages will be apparent to one of ordinary skill in the art in view of the drawings, specification and claims.

DETAILED DESCRIPTION

Figure 1:
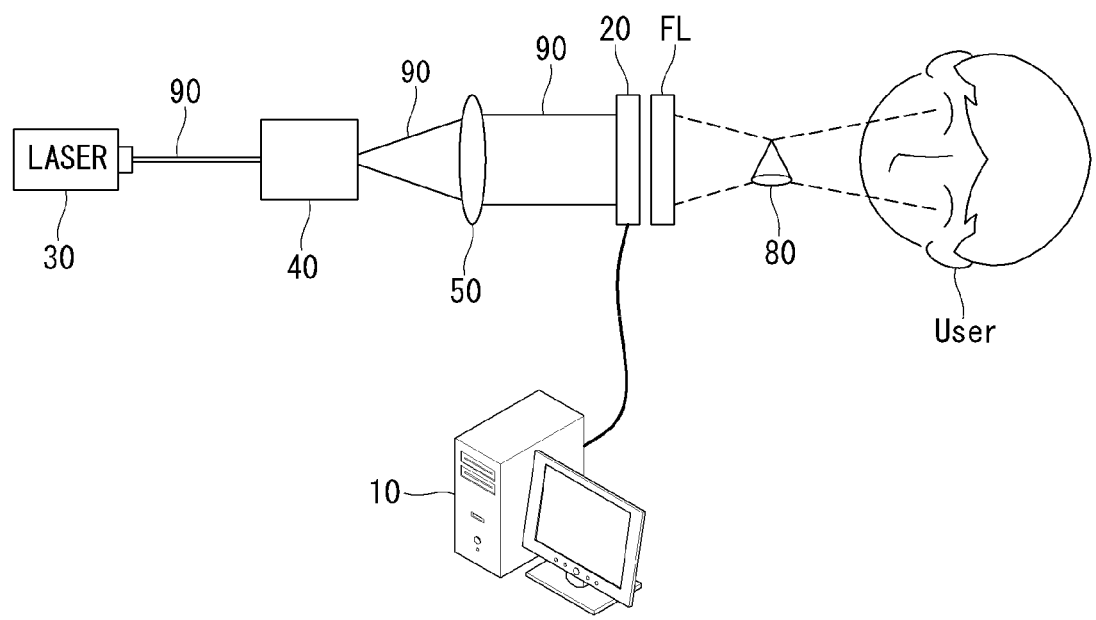
FIG. 1 is the structural drawing illustrating a digital hologram display device using a computer generated holography according to the prior art.

Embodiments will be described more fully hereinafter with reference to the accompanying drawings. Like reference numerals designate like elements throughout the specification. In the following description, if it is decided that the detailed description of known function or configuration related to the embodiments make the subject matter unclear, the detailed description is omitted.

The present disclosure relates to a digital hologram display device displaying 3D image as a hologram by using a complex modulation. The complex modulation means modulating both phase and amplitude of light. Interference of light can be maximized by the complex modulation.

Figure 2:
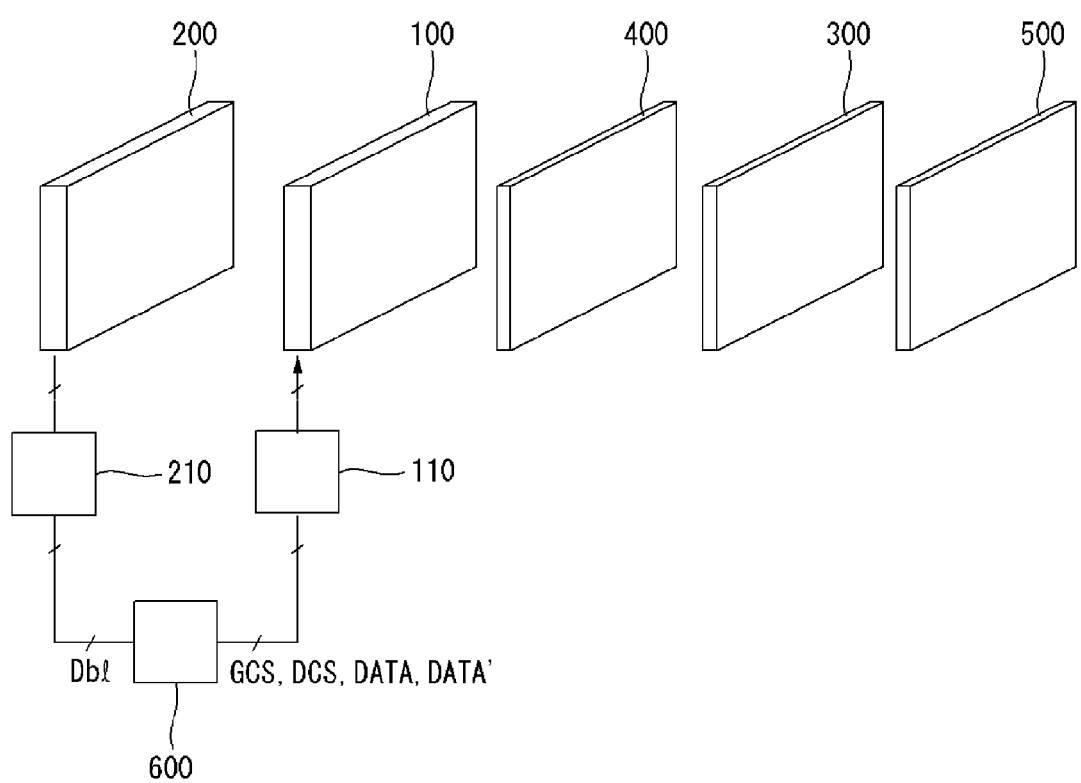
FIG. 2 is a block diagram showing schematic of a digital hologram display device.

FIG. 2 is a block diagram showing schematic of a digital hologram display device. With reference to FIG. 2, the digital hologram display device according to the example embodiments comprises a spatial light modulator (in the below, referred to as SLM) 100, a SLM driver 110, a backlight unit 200, a backlight driver 210, a light combiner 300, a phase retardation plate 400, a polarizer 500, and a controller 600.

SLM 100 is implemented as a transmission liquid crystal panel including a liquid crystal layer between an uppers substrate and a lower substrate. Pixels are arranged in a matrix form in cell areas defined by a crossing structure of data lines and the gate lines. Each pixel connected to a thin film transistor. The thin film transistor transfers a data voltage supplied via the data line to a lower electrode of the pixel in response to a gate pulse supplied through the gate line. Each pixel controls transmittance of light by driving liquid crystals of the liquid crystal layer by an electric field between the lower electrode of the lower substrate and an upper electrode of the upper substrate. SLM 100 according to the example embodiments is implemented in electrically controlled birefringence (ECB) mode. However, the embodiments are not limited thereto, and SLM 100 is implemented in any liquid crystal mode such as a twisted nematic (TN) mode, a vertical alignment (VA) mode, an in-plane switching (IPS) mode, and a fringe field switching (FFS) mode.

The pixels of the SLM 100 are divided into a first pixel and a second pixel. The first pixel is defined as a pixel formed on an odd line of the SLM 100 and a second pixel is defined as a pixel formed on an even line of the SLM 100. Especially, the first pixel is adjacent to the second pixel. Also, phase of light modulated by the first pixel is different from phase of light modulated by the second pixel. That is, the first pixel outputs a first modulation light, the second pixel outputs a second modulation light, and a phase of the first modulation light is different from a phase of the second modulation light. A method for modulating the phase of the first pixel and the second pixel will be described more specifically with reference to FIGS. 3 and 4A to 4C.

The SLM driver 110 includes a gate driver and a data driver. The data driver receives digital video data DATA from the controller 600. The data driver converts the digital video data DATA into analog data voltages under control of the controller 600. The data driver supplies the analog data voltages to the data lines of the SLM 100. The gate driver sequentially supplies gate pulses synchronized with the data voltage to the gate lines of the SLM 100.

The SLM is disposed on the backlight unit 200. The backlight unit 200 includes a plurality of light sources. The light sources may be implemented as a laser diode or a collimated light emitting diode (LED). Also, the light sources may be implemented as a combination of a plurality of colors such as a combination of a red, a green, and a blue, or one color such as a white. The backlight driver 210 supplies driving currents to the backlight unit 200 for turning on and off the light sources of the backlight unit 200 under control of the controller 600.

The light combiner 300 changes a path of the first modulation light outputted from the first pixel so that the path of the first modulation light corresponds to a path of the second modulation light outputted from the second pixel. Therefore, the light combiner 300 combines the first modulation light with the second modulation light. The light combiner 300 will be described more specifically with reference to FIGS. 5 and 6.

The phase retardation plate 400 is disposed between the SLM 100 and the light combiner 300. The phase retardation plate 400 includes a light pass layer passing the first modulation light outputted from the first pixel as it is and a half wave layer retarding a phase of the second modulation light outputted from the second pixel. The polarizer 500 is disposed on the light combiner 400. A difference between a transmission layer of the polarizer 500 and the polarization direction of the first modulation light or the polarization direction of the second modulation light is 45°. The phase retardation plate 400 and the polarizer 500 will be described more specifically with reference to FIG. 5.

Meanwhile, the digital hologram display device according to the example embodiments further comprises a field lens and an eye tracking unit. The field lens is disposed on the polarizer 500. The field lens may collect light outputted from the polarizer 500 to a point. Also, a user detector is needed for the eye-tracking unit.

The controller 600 drives the SLM 100 by controlling the SLM driver 110. The controller 600 receives the digital video data DATA and timing signals from an external computer or an external video processing unit. The controller 600 calculates the digital conversion data DATA' by adding compensation data to the digital video data DATA. The controller 600 outputs the digital video data DATA and the digital conversion data DATA' to the data driver. The digital conversion data DATA' and the compensation data will be described more specifically with reference to FIG. 5. The timing signals may include a vertical synchronization signal, a horizontal synchronization signal, a data enable signal, and a clock signal. The controller 600 generates a gate control signal GCS for controlling the gate driver and a data control signal DCS for controlling the data driver. The controller 600 outputs the gate control signal GCS to the gate driver and the data control signal DCS to the data driver. Also, the controller 600 outputs backlight control data Dbl to the backlight driver 210 for controlling the backlight driver 210.

Figure 3:
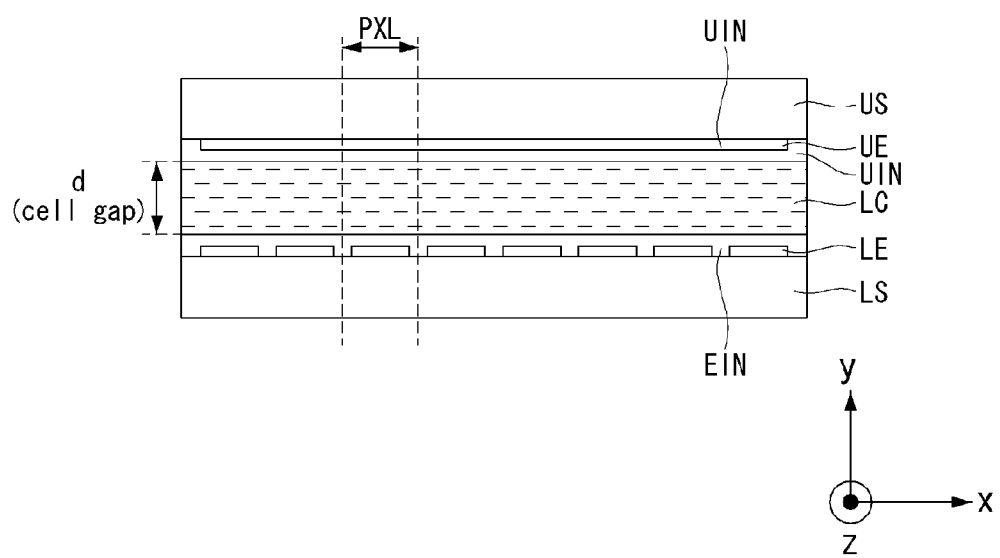
FIG. 3 is a cross-sectional diagram showing a spatial light modulator of FIG. 2 in detail.

FIG. 3 is a cross-sectional diagram showing a spatial light modulator of FIG. 2 in detail. With reference to FIG. 3, a plurality of pixels are formed in a matrix form in the SLM 100. The SLM 100 includes an upper substrate US, a lower substrate LS, and a liquid crystal layer LC between the upper substrate US and the lower substrate LS. An upper electrode UE is formed on the whole of a first face of the upper substrate US that is opposite to the lower substrate LS. Lower electrodes LE are formed on a first plane of the lower substrate LS that is opposite to the upper substrate US. Each of the lower electrodes LE is coupled to a thin film transistor. The thin film transistor supplied a data voltage of a data line to the lower electrode in response to a gate pulse of a gate line. The liquid crystal layer LC may be driven in an electrically controlled birefringence (ECB) mode. The liquid crystal layer LC driven in the ECB mode may modulate phase of light within a range of 0 to 2π. A phase modulation value of the liquid crystal may be determined by multiplying refractive index anisotropy of a liquid crystal and thickness of the liquid crystal layer LC together. The thickness of the liquid crystal layer LC is same as a cell gap d.

The SLM 100 further includes an upper insulator layer UIN coated on the upper electrode UE. The upper insulator layer UIN may be used as an alignment layer for setting pre-tilt angles of the liquid crystals. The SLM 100 further includes a lower insulator layer LIN coated on the lower electrodes LE. The lower insulator layer LIN may be used as the alignment layer.

Figure 4A:
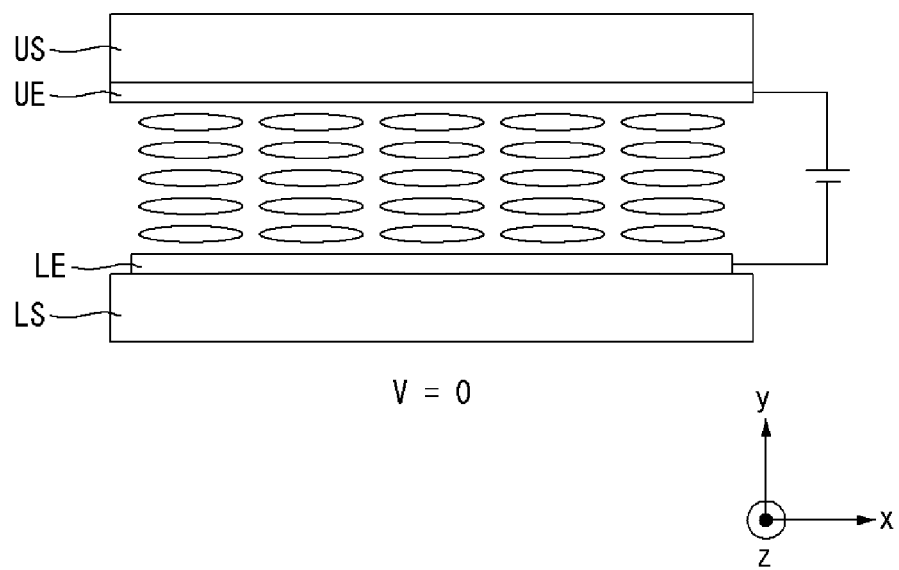
FIGS. 4A to 4C are cross-sectional diagrams of a pixel of a spatial light modulator.
Figure 4B:
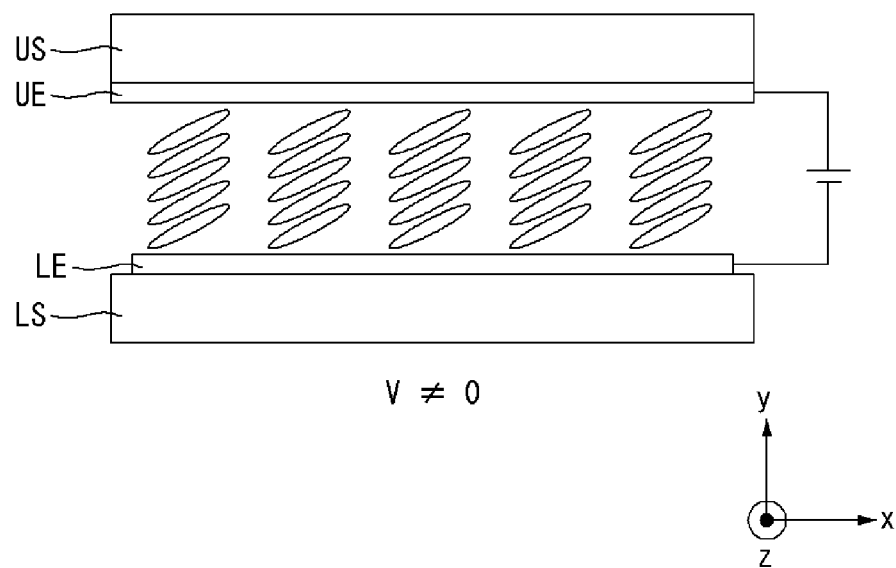
Figure 4C:
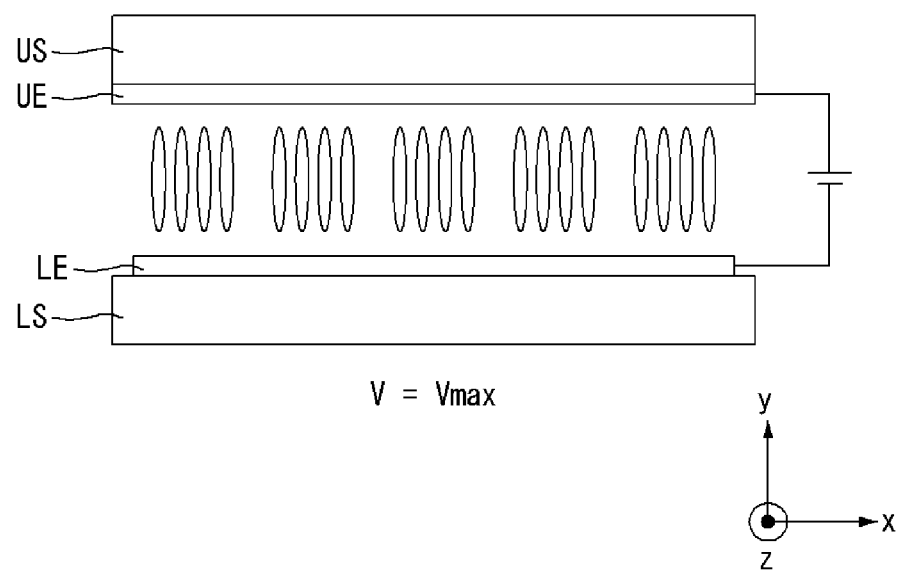

FIGS. 4A to 4C are cross-sectional diagrams of a pixel of a spatial light modulator. The arrangement of the liquid crystals in accordance with a voltage difference between the upper electrode UE and the lower electrode LE are shown in FIGS. 4A to 4C. The arrangement of the liquid crystals is changed in accordance with the voltage difference between the upper electrode UE and the lower electrode LE.

The liquid crystals driven in the ECB mode generates the refractive index anisotropy by controlling an angle of the liquid crystals in accordance with the voltage difference between the upper electrode UE and the lower electrode LE. The refractive index anisotropy Δn can be expressed in the following equation:

$$\Delta n = n_{\text{eff}} - n_o = \frac{n_e n_o}{\sqrt{n_0^2 \sin^2\theta + n_e^2 \cos^2\theta}} - n_o \quad (1)$$

In equation 1, θ is an angle between the liquid crystal and a horizontal direction (x-axis direction), $n_o$ is refractive index in the major axis of the liquid crystal, $n_e$ is refractive index in the minor axis of the liquid crystal, and $n_{eef}$ is refractive index in the angle θ.

An electric field between the lower electrode LE and the upper electrode UE is not formed at all as shown in FIG. 4A because the liquid crystals maintain initial arrangement. The liquid crystals maintain initial arrangement when 0V is supplied to the lower electrode LE. Initial arrangement refers that the major axis of the liquid crystal is parallel to the horizontal direction (x-axis direction). The angle θ is 0° in initial arrangement, so $n_{eff}$ is same as $n_e$. Thus, Δn is "$n_e - n_o$", and Δn may be a maximum value.

An electric field between the lower electrode LE and the upper electrode UE is formed as shown in FIG. 4B when a voltage between 0V and a maximum voltage Vmax is supplied to the lower electrode LE. The angle θ is increased as the voltage supplied to the lower electrode LE is increased. Therefore, Δn is decreased as the angle θ is increased.

An electric field between the lower electrode LE and the upper electrode UE is formed in maximum as shown in FIG. 4C when the maximum voltage Vmax is supplied to the lower electrode LE. The angle θ is 90° when the maximum voltage Vmax is supplied to the lower electrode LE. Therefore, Δn is "$n_o - n_o$", and Δn may be a minimum value.

The embodiments described herein set the cell gap d in accordance with the refractive index anisotropy Δn of the liquid crystal so that the phase modulation value "KΔn*d" has a maximum value "2π". Finally, the SLM 100 may modulate phase of light within 0 to 2π by controlling the angle θ. Light may be horizontal plane-polarized light that vibrates in a horizontal direction (x-axis direction).

Figure 5:
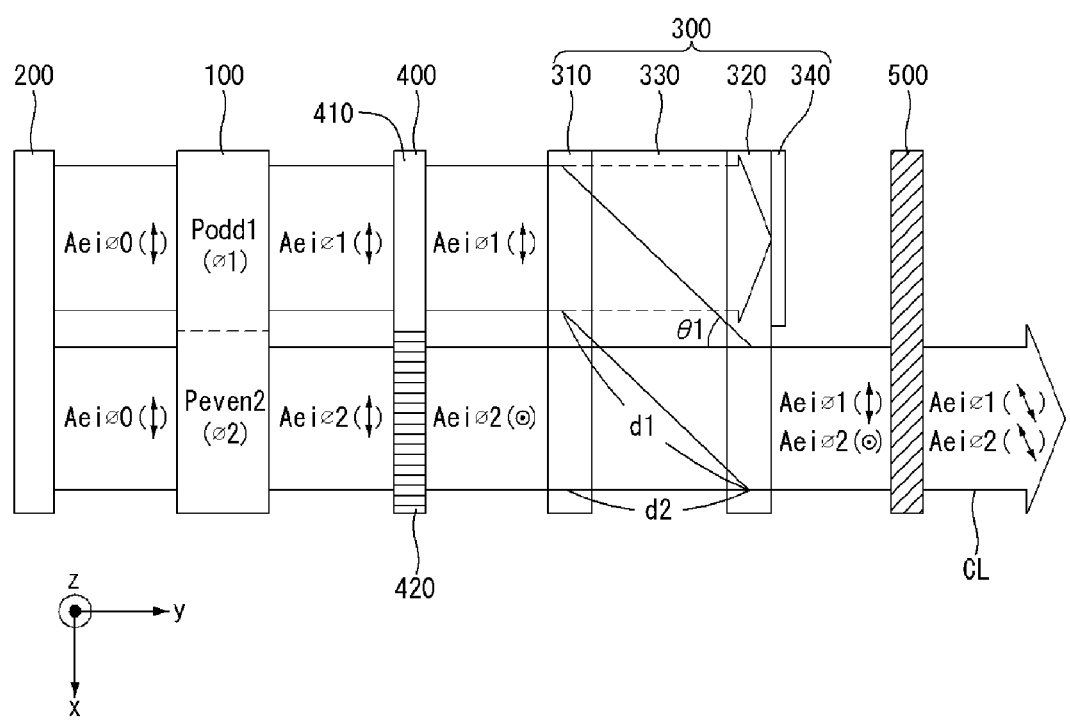
FIG. 5 is a cross-sectional diagram showing a backlight unit, a spatial light modulator, a phase retardation plate, a light combiner, and a polarizer of FIG. 2.

FIG. 5 is a cross-sectional diagram showing a backlight unit, a part of a spatial light modulator, a phase retardation plate, a light combiner, and a polarizer of FIG. 2. In the below, a complex modulation method according to the embodiments will be described with reference to FIG. 5. The complex modulation method refers to modulating both phase and amplitude of light. In FIG. 5, two pixels of the spatial light modulator, a first pixel and a second pixel, are only shown for convenience of explanation.

With reference to FIG. 5, light sources of the backlight unit 200 emit a first plane-polarized light Aeiφ0($\updownarrow$) which vibrates in a horizontal direction (x-axis direction). Also, a phase of the first plane-polarized light Aeiφ0($\updownarrow$) is φ0 and an amplitude of the first plane-polarized light Aeiφ0($\updownarrow$) is A. The SLM is disposed on the backlight unit 200. The first plane-polarized light Aeiφ0($\updownarrow$) is input to the SLM 100.

Each pixel of the SLM 100 may modulate phase of light within 0 to 2π by controlling arrangement of liquid crystals as described in FIGS. 3 and 4A to 4C. Especially, first pixels Podd1 formed on odd lines of the SLM 100 modulates the phase φ0 of the first plane-polarized light Aeiφ0($\updownarrow$) into φ1. Second pixels Peven2 formed on even lines of the SLM 100 modulates the phase φ0 of the first plane-polarized light Aeiφ0($\updownarrow$) into φ2. Therefore, the first pixels Podd1 output a first modulation light Aeiφ1($\updownarrow$) and the second pixels Peven2 output a second modulation light Aeiφ2($\updownarrow$). Meanwhile, the first pixel and the second pixel are only shown for convenience of explanation. However, it is general that the SLM 100 has a plurality of odd lines and even lines, the plurality of first pixels are formed on a odd line, and the plurality of the second pixels are formed on an even line.

The phase retardation plate 400 is disposed on the SLM 100. The phase retardation plate 400 includes a light pass layer 410 passing the first modulation light Aeiφ1($\updownarrow$) outputted from the first pixel as it is and a half wave layer 420 retarding a phase of the second modulation light Aeiφ2($\updownarrow$) outputted from the second pixel. The light pass layer 410 is opposite to the first pixel Podd1 and the half wave layer 420 is opposite to the second pixel Peven2. Thus, the light pass layer 410 passes the first modulation light Aeiφ1($\updownarrow$) as it is. Also, the polarization direction of the second modulation light Aeiφ2($\odot$) is changed from the horizontal direction (x-axis direction) to a vertical direction (z-axis direction) due to the half wave layer 420. Therefore, the first modulation light Aeiφ1($\updownarrow$) vibrates the horizontal direction (x-axis direction) because the polarization direction of the first modulation light Aeiφ1($\updownarrow$) is the horizontal direction (x-axis direction) while the second modulation light Aeiφ2($\odot$) vibrates the vertical direction (z-axis direction) because the polarization direction of the second modulation light Aeiφ2($\odot$) is the vertical direction (z-axis direction) after passing the phase retardation plate 400.

The light combiner 300 includes a first light conversion film 310, a second light conversion film 320, a spacer 330, and a black pattern 340. The first light conversion film 310 may change a path of light having a specific polarization direction. For example, the first light conversion film 310 may change a path of light having the horizontal direction (x-axis direction), and may not change a path of light having the vertical direction (z-axis direction). Therefore, the first light conversion film 310 changes a path of the first modulation light Aeiφ1($\updownarrow$) having the horizontal direction (x-axis direction). Thus, the first modulation light Aeiφ1($\updownarrow$) is obliquely input to the second light conversion film 320 with a first angle θ1 as shown in FIG. 5. The first angle θ1 is an angle between the first modulation light Aeiφ1($\updownarrow$) and a vertical line from a plane of incidence of the second light conversion film 320. The first light conversion film 310 passes the second light modulation light Aeiφ2($\odot$) as it is because the first light conversion film 310 does not change a path of the second modulation light $Aei\phi2(\odot)$ having the vertical direction (z-axis direction).

The second light conversion film 320 may change a path of light having a specific polarization direction. For example, the second light conversion film 320 may change a path of light having the horizontal direction (x-axis direction), and may not change a path of light having the vertical direction (z-axis direction). Therefore, the second light conversion film 320 changes a path of the first modulation light $Aei\phi1(\updownarrow)$ having the horizontal direction (x-axis direction). Thus, the first modulation light $Aei\phi1(\updownarrow)$ is changed parallel to the second modulation light $Aei\phi2(\odot)$ by the second light conversion film 320. Meanwhile, the first angle θ1 may be from 30° to 70°, desirably from 50° to 60°. The first light conversion film 310 and the second light conversion film 320 will be described more specifically with reference to FIG. 6.

The spacer 330 provides a space between the first light conversion film 310 and the second light conversion film 320. The space is needed in order that the first modulation light $Aei\phi1(\updownarrow)$ is combined with the second modulation light $Aei\phi2(\odot)$ because the path of the first modulation light $Aei\phi1(\updownarrow)$ is changed by the first light conversion film 310. The first light conversion film 310 is attached to one side of the spacer 300 and the second light conversion film 320 is attached to the other side. The spacer 330 may be implemented as an optically clear adhesive (OCA) film.

The black pattern 340 is formed on a part of the second light conversion film 320 that is opposite to the first pixel Podd1. The black pattern blocks a part of the first modulation light $Aei\phi1(\updownarrow)$ because the part of the first modulation light $Aei\phi1(\updownarrow)$ does not change a path in spite of the first light conversion film 310.

Therefore, as described above, the light combiner 300 may combine the first modulation light $Aei\phi1(\updownarrow)$ outputted from the first pixel Podd1 with the second modulation light $Aei\phi2(\odot)$ outputted from the second pixel Peven2.

Meanwhile, a travel range of the first modulation light $Aei\phi1(\updownarrow)$ is different from a travel range of the second modulation light $Aei\phi2(\odot)$ in the light combiner 300. That is, there is a problem that the travel range of the first modulation light $Aei\phi1(\updownarrow)$ is longer than the travel range of the second modulation light $Aei\phi2(\odot)$. To solve this problem, the second pixel Peven2 should retard the phase of the second modulation light $Aei\phi2(\odot)$ in consideration of a travel range of the first modulation light $Aei\phi1(\updownarrow)$ and a travel range of the second modulation light $Aei\phi2(\odot)$. More the second modulation light $Aei\phi2(\odot)$ retards, More slow a speed of the second modulation light $Aei\phi2(\odot)$. Therefore, the first modulation light $Aei\phi1(\updownarrow)$ and the second modulation light $Aei\phi2(\odot)$ may be outputted from the light combiner 300 simultaneously when the second pixel Peven2 retards the phase of the second modulation light $Aei\phi2(\odot)$ to $\phi2'\cdot\phi2'$ can be expressed in the equation "$\phi2+\Delta\phi$", and $\Delta\phi$ can be expressed in the following equation:

$$\Delta\Phi = (d1-d2)\cdot n \qquad (2)$$

In equation 2, d1 is the travel range of the first modulation light $Aei\phi1(\updownarrow)$, d2 is the travel range of the second modulation light $Aei\phi2(\odot)$, n is refractive index of the spacer 330.

The controller 600 calculates digital conversion data by adding compensation data to digital video data and controls to supply the digital conversion data to the second pixel Peven2 in order that The second pixel Peven2 retards the phase of the second modulation light $Aei\phi2(\odot)$ to $\phi2'$. The compensation data is predetermined through an experiment in consideration of $\Delta\phi$. Also, the controller 600 may include a memory for storing the compensation data. The controller controls to supply the digital video data to the first pixel Podd1 and the digital conversion data to the second pixel Peven2.

The polarizer 500 a polarizer is disposed on the light combiner 300. A difference between a transmission layer of the polarizer 500 and the polarization direction of the first modulation light $Aei\phi1(\updownarrow)$ is 45°. Also, a difference between a transmission layer of the polarizer 500 and the polarization direction of the second modulation light $Aei\phi2(\odot)$ is 45°, too. As shown in FIG. 5, the polarization direction of the first modulation light $Aei\phi1(\updownarrow)$ is a horizontal direction (x-axis direction), the polarization direction of the second modulation light $Aei\phi2(\odot)$ is a vertical direction (z-axis direction). That is, the first modulation light $Aei\phi1(\updownarrow)$ is a horizontal polarized light, the second modulation light $Aei\phi2(\odot)$ is a vertical polarized light. Also, the transmission layer of the polarizer 500 transmits +45° (or −45°) polarized light. Finally, the polarization direction of the first modulation light outputted from the polarizer 500 is same as the second modulation light outputted from the polarizer 500 because the polarizer 500 transmits +45° (or −45°) polarized light. Accordingly, the first modulation light and the second modulation light can be complex modulated as expressed in the following equation:

$$Ae^{i\phi_1} + Ae^{i\phi_2} = 2A\cos\left[\frac{(\phi_1-\phi_2)}{2}\right]e^{i\frac{(\phi_1+\phi_2)}{2}} \qquad (3)$$

In equation 3, A is an amplitude, $\phi1$ is the phase of the first modulation light, $\phi2$ is the phase of the second modulation light. A phase of the combined light CL that combines the first modulation light with the second modulation light is "$2A \cos[(\phi1-\phi2)/2]$", and an amplitude of the combined light CL is $e^{i(\phi1-\phi2)/2}$.

The embodiments described herein may modulate phase of light emitting from the backlight unit 200, complex modulate light by combining light with the light combiner 300. Especially, the embodiments described herein may display a hologram by maximizing interference of light due to a complex modulated light.

Figure 6:
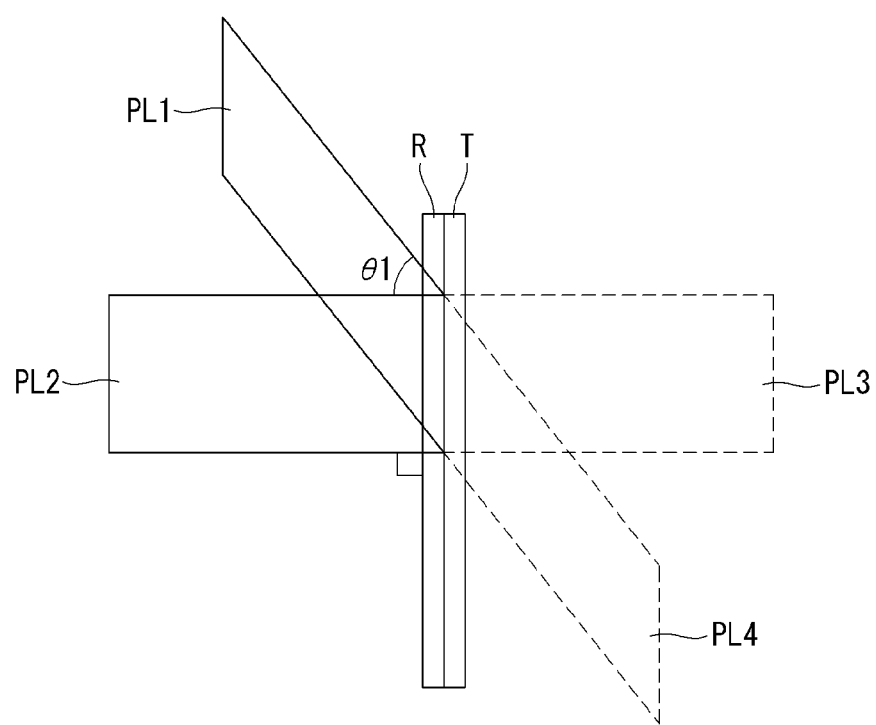
FIG. 6 is an example diagram showing first and second beam path conversion films of a light combiner.

FIG. 6 is an example diagram showing first and second beam path conversion films of a light combiner. With reference to FIG. 6, each of the first and second light conversion film 310, 320 includes a transparent substrate T and a record medium R. The record medium R is formed on the transparent substrate T. The record medium R is implemented as a photopolymer. A light path pattern is recorded in the record medium R. Therefore, each of the first and second light conversion film 310, 320 may change a light path by the record medium R.

More specifically, a first parallel light PL1 is obliquely input to a plane of incidence of the record medium R with a first angle θ1. The first angle θ1 is an angle between the first parallel light PL1 and a vertical line from the plane of incidence of the record medium R. A second parallel light PL2 is vertically input to the plane of incidence of the record medium R. When the first parallel light PL1 and the second parallel light PL2 is incident to the record medium R, interference patterns by the first parallel light PL1 and the second parallel light PL2 is recorded in the record medium R. Therefore, when the first parallel light PL1 is incident to the record medium R, the third parallel light PL3 is outputted from the record medium R because the first parallel light PL1 is diffracted with the first angle θ1. Also, when the second parallel light PL2 is incident to the record medium R, the fourth parallel light PL4 is outputted from the record medium R because the second parallel light PL2 is diffracted with the first angle θ1.

Meanwhile, if the record medium R is recorded with a horizontal polarized light, the diffraction is occurred when the horizontal polarized light is incident to the record medium R. Therefore, if the record medium R is recorded with a horizontal polarized light, the diffraction is not occurred when a vertical polarized light is incident to the record medium R.

The first light conversion film 310 including the record medium R may change a path of light having a specific polarization direction. For example, the first light conversion film 310 changes a path of the first modulation light Aeiφ1( ↕ ) having the horizontal direction (x-axis direction). Thus, the first modulation light Aeiφ1(↕) is obliquely input to the second light conversion film 320 with a first angle θ1 as shown in FIG. 5. Also, the second light conversion film 320 including the record medium R may change a path of light having a specific polarization direction. For example, the second light conversion film 320 changes a path of the first modulation light Aeiφ1(↕) having the horizontal direction (x-axis direction). Thus, the first modulation light Aeiφ1(↕) is changed parallel to the second modulation light Aeiφ2(⊙) by the second light conversion film 320. Furthermore, The first light conversion film 310 and the second light conversion film 320 pass the second light modulation light Aeiφ2 (⊙) as it is because the first light conversion film 310 and the second light conversion film 320 do not change a path of the second modulation light Aeiφ2(⊙) having the vertical direction (z-axis direction).

The embodiments described herein may modulate phase of light emitting from the backlight unit 200, complex modulate light by combining light with the light combiner 300. Especially, the embodiments described herein may display a hologram by maximizing interference of light due to a complex modulated light. Therefore, the embodiments described herein have four advantages compared with the prior art as following: (1) it is not need to align a plurality of SLMs, (2) cost for fabricating the 3D image display device is decreased because only one SLM is needed, (3) thickness of 3D image display device is decreased, and (4) driving of the 3D image display device is simple.

Although the embodiments of this application have been described with reference to a number of illustrative embodiments thereof, it should be understood that numerous other modifications and embodiments of this application can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A digital hologram display device comprising:
    a spatial light modulator including a first pixel outputting a first modulation light by modulating a phase of a first plane-polarized light and a second pixel outputting a second modulation light by modulating the phase of the first plane-polarized light, wherein the second pixel is adjacent to the first pixel; and
    a light combiner changing a path of the first modulation light outputted from the first pixel so that the path of the first modulation light is parallel to a path of the second modulation light outputted from the second pixel to complex modulate the first modulation light with the second modulation light,
    wherein a phase of the first modulation light is different from a phase of the second modulation light.

2. The digital hologram display device of claim 1 further comprising:
    a backlight unit including light sources illuminating the first plane-polarized light to the spatial light modulator, wherein the spatial light modulator is disposed on the backlight unit; and
    a phase retardation plate including a light pass layer passing the first modulation light outputted from the first pixel as it is and a half wave layer retarding the phase of the second modulation light outputted from the second pixel.

3. The digital hologram display device of claim 2, wherein the light pass layer is opposite to the first pixel and the half wave plate is opposite to the second pixel.

4. The digital hologram display device of claim 2, further comprising a polarizer disposed on the light combiner, wherein a difference between a transmission layer of the polarizer and the polarization direction of the first modulation light is 45° and a difference between the transmission layer and the polarization direction of the second modulation light is 45°.

5. The digital hologram display device of claim 4, wherein the first modulation light is a horizontal polarized light,
    wherein the second modulation light is a vertical polarized light,
    wherein the transmission layer of the polarizer transmits +45° or −45° polarized light.

6. The digital hologram display device of claim 2, wherein the light combiner includes:
    a first light conversion film changes the path of the first modulation light to the direction of the path of the second modulation light; and
    a second light conversion film changes the path of the first modulation light so that the first modulation light is outputted parallel to the second modulation light.

7. The digital hologram display device of claim 6, wherein the light combiner further includes a spacer between the first light conversion film and the second light conversion film.

8. The digital hologram display device of claim 6, wherein a black pattern is formed opposite to the first pixel on the second light conversion film for blocking the first modulation light.

9. The digital hologram display device of claim 1, wherein the first plane-polarized light, the first modulation light, and the second modulation light is parallel rays.

10. The digital hologram display device of claim 9, wherein the light sources emit a laser beam.

11. The digital hologram display device of claim 1, wherein the first pixel is formed on odd lines of the spatial light modulator and the second pixel is formed on even lines of the spatial light modulator.

12. The digital hologram display device of claim 1, wherein the spatial light modulator includes a liquid crystal layer between an upper substrate and a lower substrate, wherein the liquid crystal layer changes the phase of the first plane-polarized light within a range of 0 to 2π.

13. The digital hologram display device of claim 1 further comprising a controller calculates digital conversion data adding compensation data to input digital video data, controls to supply the input digital video data to the first pixel, and supplies the digital conversion data to the second pixel, wherein the compensation data is calculated for retarding a phase of the second modulation light in consideration of a travel range of the first modulation light and a travel range of the second modulation light.

14. The digital hologram display device of claim 3, wherein the light pass layer is not opposite to the second pixel, and the half wave plate is not opposite to the first pixel.

15. The digital hologram display device of claim 8, wherein the black pattern is not formed opposite to the second pixel on the second light conversion film.

* * * * *